United States Patent [19]

Micka et al.

[11] Patent Number: 5,577,222
[45] Date of Patent: Nov. 19, 1996

[54] SYSTEM FOR ASYNCHRONOUSLY DUPLEXING REMOTE DATA BY SENDING DASD DATA GROUPED AS A UNIT PERIODICALLY ESTABLISHED BY CHECKPOINT BASED UPON THE LATEST TIME VALUE

[75] Inventors: William F. Micka, Tucson, Ariz.; Claus W. Mikkelsen; Robert W. Shomler, both of Morgan Hill, Calif.

[73] Assignee: International Business Machines Corporation, Armonk, N.Y.

[21] Appl. No.: 992,219

[22] Filed: Dec. 17, 1992

[51] Int. Cl.⁶ .................................................. G06F 13/00
[52] U.S. Cl. .................... 395/439; 395/200.12; 395/427; 395/555; 395/601; 395/849; 395/855; 395/878
[58] Field of Search .................................... 395/550, 600, 395/200.12, 427, 849, 878, 439; 364/130, 131, 143

[56] References Cited

U.S. PATENT DOCUMENTS

| | | | |
|---|---|---|---|
| 4,020,466 | 4/1977 | Cordi et al. | 364/200 |
| 4,159,517 | 6/1979 | Paradine et al. | 395/550 |
| 4,503,499 | 3/1985 | Mason et al. | 364/200 |
| 4,507,751 | 3/1985 | Gawlick et al. | 364/900 |
| 4,814,971 | 3/1989 | Thatte | 364/200 |
| 4,916,605 | 4/1990 | Beardsley et al. | 364/200 |
| 5,148,540 | 9/1992 | Beardsley et al. | 395/575 |
| 5,155,845 | 10/1992 | Beal et al. | 395/575 |
| 5,170,480 | 12/1992 | Mohan et al. | 395/600 |
| 5,321,832 | 6/1994 | Tanaka et al. | 395/600 |

*Primary Examiner*—Thomas C. Lee
*Assistant Examiner*—Po C. Huang
*Attorney, Agent, or Firm*—Benman Collins & Sawyer

[57] ABSTRACT

A system for asynchronously duplexing direct access storage device (DASD) data in a plurality of DASD subsystems has the advantage of decoupling the data duplexing operation from the DASD write I/O operation. This ensures the write does not incur unnecessary wait states in the subsystem. By establishing a sequence checkpoint at which time a set of information packets are grouped together and processed as a single sequence unit, this decoupling and independent operation takes place. Through this independence, data copying to a secondary location can take place without affecting the performance of the subsystems and also not affecting the corresponding integrity of the data that is being updated.

13 Claims, 6 Drawing Sheets

| TIME STAMP VALUE | ---- SUBSYSTEM SEQUENCE NUMBERS ---- | | | | |
|---|---|---|---|---|---|
| | SS-A | SS-B | SS-C | SS-D (a) | SS-E (b) |
| 05300 | | | | >75 (c) | |
| 11001 | | | 380 | | |
| 11005 | 121 | >15 (e) | 381 | | 401 (g) |
| 11006 | | | | | |
| 11040 | | | >382 (f) | | |
| 11100 | 122 | | | | |
| 11200 | 123 | | | | |
| 11210 | | 16 (i) | | | |
| 11215 | | 17 | | | 402 |
| 11220 | | 18 | | | |
| 11350 | >124 (d,i) | | 383 | | |
| 11375 | 125 | | | 75(h) | 403 |

FIGURE 6

SYSTEM FOR ASYNCHRONOUSLY DUPLEXING REMOTE DATA BY SENDING DASD DATA GROUPED AS A UNIT PERIODICALLY ESTABLISHED BY CHECKPOINT BASED UPON THE LATEST TIME VALUE

FIELD OF THE INVENTION

The present invention relates to remote data duplexing and more particularly to remote duplexing of data from a direct access storage device (DASD).

BACKGROUND OF THE INVENTION

It is very important that there is a remote capability for real-time backup protection of direct access storage device (DASD) data at a distant location. This is typically referred to as remote duplexing or remote data copying. It is important to have this type of service to provide disaster backup to data. Many entities would want backup service to protect them in the case of disaster such as a fire or the like. Most customers want this backup capability to be DASD storage based and application independent. That is, they do not want to have a separate backup process per application or per data base system.

Most important is that a customer requires that the data copy at the remote location be consistent, that is, that the data can be used for recovery. Since means for consistent data copy must be accomplished in view of there being multiple DASD subsystems connected to multiple host systems, a design for remote data duplexing requires a means for ensuring system-wide sequence registration of write data in which DASD control units sends an explicit token or information packet to a sequencer program for each write operation that is executed. To ensure accurate sequencing, that registration process must be synchronous with the write operation being registered, that is, the write operation cannot be completed by the control unit until the information packet has been accepted by the sequencer.

Accordingly, for an information packet synchronous with the host write operation, the sending of the information packet by the control unit must be performed on a different internal storage path, not the storage path that is processing the write operation. In an ideal situation, the time to acquire a storage path, connect to a channel to the global sequencer and send the information packet would be completely overlapped by the data transfer of the write data. Any delay in acquiring a storage path or in connecting to the channel may cause the information packet send time to be greater than the write data transfer time thus delaying the completion of the primary write operation.

Although the data duplexing can be asynchronous, there is a synchronous component associated with each information packet. This synchronous component affects the efficiency of the overall system. This problem can be particularly acute during those periods of high update activity because it is very difficult for multiple events to be communicated to a sequencer in a single communication. Hence, what is needed is a system for improving the efficiency of an asynchronous remote data duplexing system. The system should be one that does not compromise the integrity of the data being copied and also does not affect the performance of the system.

SUMMARY OF THE INVENTION

The present invention is directed to a system for allowing the DASD subsystems to decouple the communications of update events to a global sequencer from the data update operation being reported. It also provides in periods of high update activity, for multiple events to be communicated to the global sequencer in a single communication. Finally, the system allows communication of several update events to be included with other communications such as that of reading the updated data preparatory to writing it to the remote DASD copy. The inclusion of update events with other events improves the efficiency of the remote copying.

In the system a sequencer establishes a session and identifies the extents to be duplexed. As part of establishing the session, the sequencer sets a time of day for each subsystem. This can be correlated with a clock time for all the other subsystems participating in that particular session. The sequencer then establishes a sequence checkpoint at which time a set of information packets are grouped together and processed as a single sequence unit.

This sequence unit will be processed as though all the writes in the group had occurred at the same time. The sequencer searches for the latest time value time stamp from each subsystem to establish the checkpoint group. The earliest time value of these time stamps becomes the time stamp value for the checkpoint. All information packets with a time stamp value which is earlier than the check-point time stamp form the checkpoint group. This check-point group will then be sent as a group to the secondary station.

In so doing, a system is provided which allows write operations to complete independently of sending the information packet to the sequencer. This ensures that the write does not incur any unnecessary wait states while the subsystem is sending the information packet to the sequencer. It also allows for decoupling the write operation from sending the information packet to the sequencer. In addition, there is efficient processing of multiple and rapid writes of the same data by buffering multiple information packets. If the writes come in rapid succession, faster than the subsystems and sequencers' ability to retain actual update data, only the most recent data update for these tokens or the information packets that have been received via the present invention need to be applied to the secondary system. Finally, the subsystems clocks are correlated with the host clock and therefore writes can be associated with other host activities. All these things taken together provide for an improved, more efficient system for copying data to remote locations.

DETAILED DESCRIPTION OF THE INVENTION

The present invention relates to a method for an improved asynchronous remote data duplexing of token or information packet messages.

The following description is presented to enable one of ordinary skill in the art to make and use the invention and is provided in the context of a patent application and its requirements. Various modifications to the preferred embodiments will be readily apparent to those skilled in the art and the generic principles defined herein may be applied to other embodiments.

The present invention is utilized in conjunction with and is an improvement upon an asynchronous duplexing system. In such a system, host system software notifies DASD subsystems that data duplexing of certain extents (sets of tracks and cylinders) are to be performed. DASD subsystems then monitor those extents for write activity, and notify a sequencing program service in the host system that a write operation is in progress by providing a DASD-information packet that describes the DASD track(s) and record(s) that are being written as well as a subsystem generated sequence number for the update.

The sequencing program combines the DASD-provided information packet with a time stamp of that write operation relative to all others that are being duplexed within the cooperating set of systems. When this sequence number has been assigned and the write data transferred to the subsystem, the subsystem may signal operation complete to the host that initiated the I/O write operation. The information packet is also sent to the secondary location via asynchronous message to provide advance information that the identified DASD will be updated.

Subsequently, a data mover program, having been given the information packet, retrieves the updated data from the subsystem and causes it to be sent, together with the information packet, to the secondary location. The secondary system queues the DASD update data as it is received; then it schedules I/O operations to update its shadow (duplex) data copies in the same sequence as they appeared at the primary systems. In the event of disaster at the primary location, a recovery process at the secondary data location can interpret the sequenced information packets and data updates received at the secondary to present a consistent-in-time image of that data as it was on the primary system(s) DASD.

The data copy consistency objective is for the recovery process to be able to provide an image of DASD data at the recovery location that is equivalent to the data that would have been on DASD at the primary location had the primary system complex suffered a complete and total outage but with no equipment destruction. Following execution of the recovery process at the remote location, the secondary data should appear to applications exactly as it would have some short time earlier at the primary. The amount of time "earlier" is a 'window of data loss' that customers may influence by system design parameters such as distance of recovery site from primary, bandwidth of transfer available between the primary and recovery site, and processing power available for the data mover.

Although this system works effectively for its intended purpose, it has one major performance deficiency. An essential component of such a system is that the same sequence of primary DASD subsystems be provided at the secondary location. The sequence order is achieved via a global event sequence log. The global event sequence log entries are created and sequenced as a result of the DASD subsystem initiated communication to the global sequencer for each data write operation.

This type of system imposes the burden of DASD subsystem communication sequence to the global sequencer for each update synchronous with the particular host data update operation. In such a system the DASD subsystem sends an explicit information packet to the sequencer program for each write operation to be executed.

To ensure accurate sequencing, the registration process must be synchronous with the operation being registered, that is the write operation cannot be completed by a control unit until the information packet has been accepted by the sequencer. To more specifically describe this system refer now to FIGS. 1 and 2.

Figure 1:
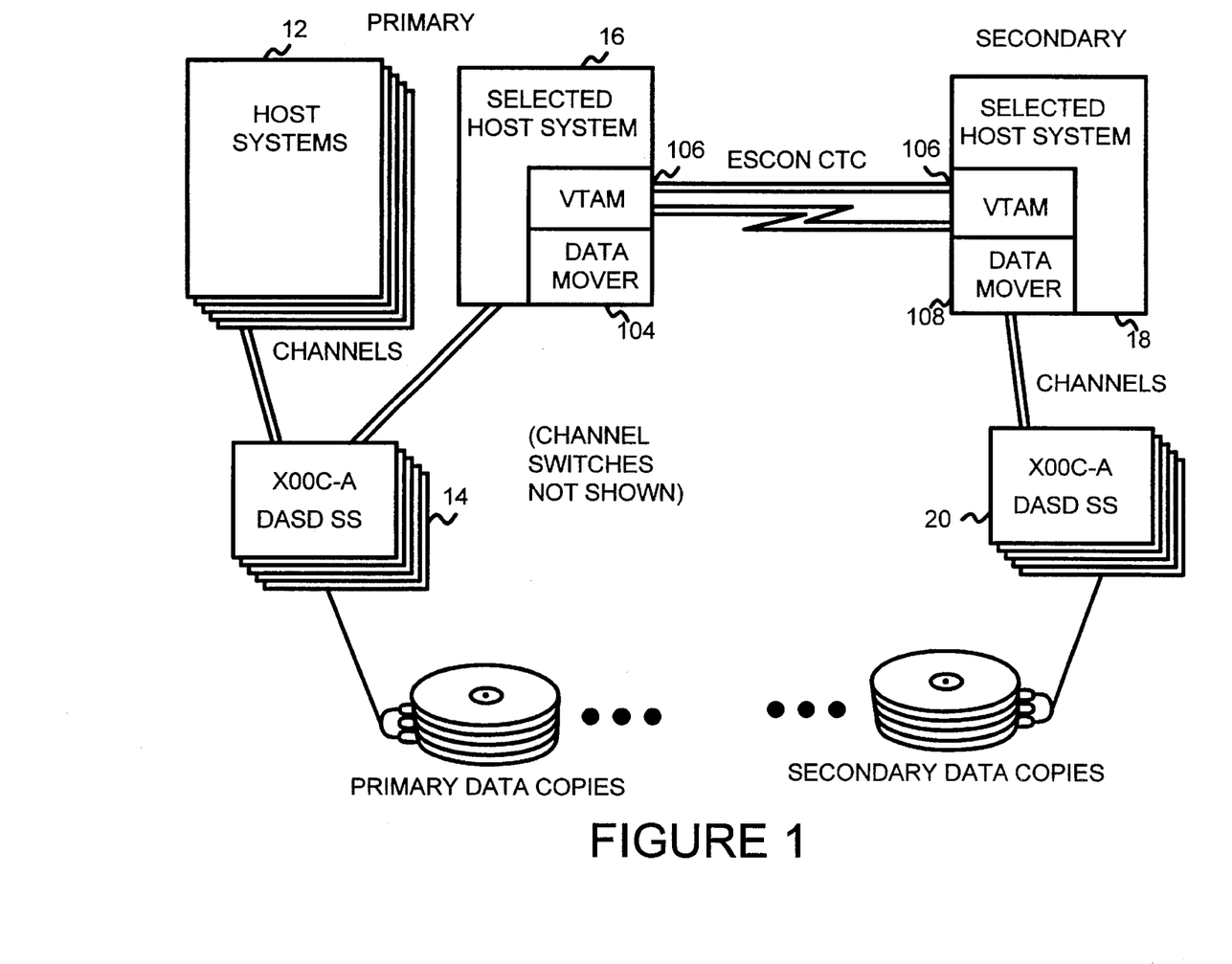
FIGS. 1 and 2 are diagrams of a remote data duplexing system.

Consider a primary site consisting of one or more host systems 12 that share access to some number of DASD subsystems 14 (FIG. 1). For the purpose of this description, one of these systems 12 will be designated the "selected primary system." In this selected system 12 are two functional programs: one labeled data mover 104, the second is Virtual Telecommunications Access Method (VTAM) 106 or other communications manager with capability for inter-system communications over high bandwidth links. VTAM 106 will be used to refer to this communications program function.

The data mover 104 function consists of two parts: a serializer and a data mover. The serializer receives a write sequence information packet for every write operation on all DASD subsystems 14 in the primary that has been selected for duplexing (maintaining a shadow copy at the secondary), and puts these information packets into messages for VTAM 106 to send to a receiving system at the secondary location. The data mover retrieves changed data—records written to the primary DASD subsystem 14—and forms them and their information packets into messages for VTAM 106 to send to the secondary.

VTAM 106 programs in the primary and secondary systems transport messages between the primary and secondary. These messages communicate the establishment of shadowed (duplexed) data extents, information packets that indicate updates in progress, and information packets with changed data to be applied to the secondary data copies. The VTAM 106 programs operate on high bandwidth communication networks of one or more connections between the primary and secondary system. T1 lines, T3 lines, or other telecommunications services may be employed to support distances greater than ESCON or other direct channel to channel connections can support. The secondary may be any distance from the primary.

The secondary system has a data mover 108 functional program in addition to its above-described VTAM 106 service. The secondary data mover 108 receives the VTAM 106 messages sent by the primary, extracts and maintains the sequencing information packets, and applies updated data to copies of the DASD subsystem 20 at the secondary site.

Figure 2:
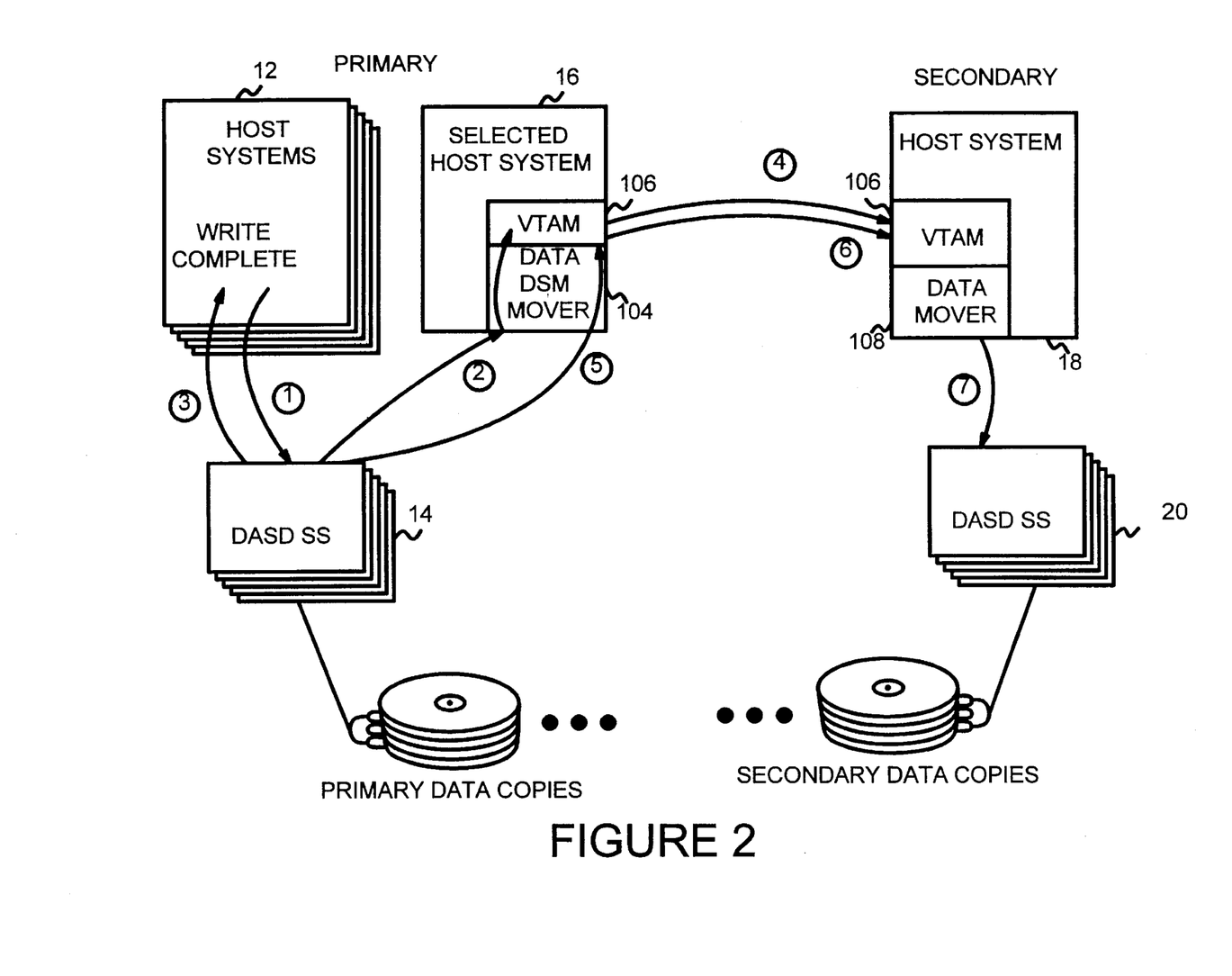

Duplexing operation is established for the selected DASD subsystem 16, volumes or extents, by the primary system similar to the method for establishing a Concurrent Copy session. The primary data mover if needed, may establish an initial secondary copy of the duplexed data. Once the duplexing session has been initiated, the DASD subsystems 14 will monitor those extents for data writes and take the following action when a write operation is begun (FIG. 2).

A Channel Command Word (CCW) that initiates a data write sequence to a duplexed DASD address is processed by a primary DASD subsystem 14 (this may be the first of several CCWs for that sequence, as for an ECKD Locate Record, CCW); data moves from the writing system 12 to the primary DASD subsystem 14 (1). The primary DASD subsystem 14 sends a write information packet (2) to the data mover 104 16 serializer program (which may be or may not be on the same system that is writing the data to DASD subsystem 14). The request information packet identifies the duplex session, device, track(s) and record(s) to be written.

Figure 3:
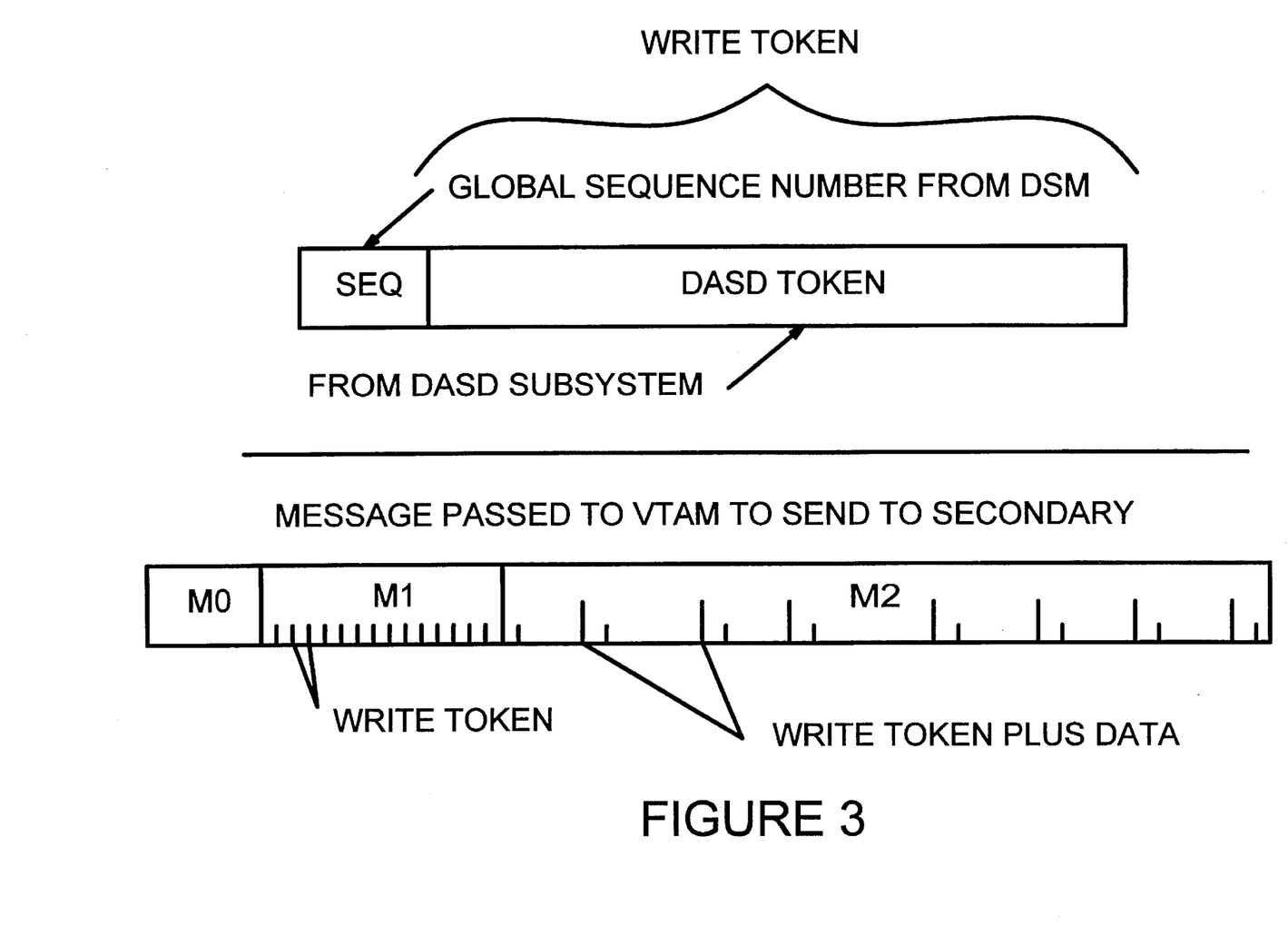
FIG. 3 is a diagram of information packet messages.

The data mover 104 serializer adds the information packet to the next message that will be passed to VTAM 106 to send to the secondary (FIG. 3). Sending this information packet to the secondary is illustrated by (4) in FIG. 2.

The DASD subsystem 14 performing the DASD data write completes its data write operation and signals write complete to the requesting system (3). (If this is the end of the host channel program, the write complete will be posted to the requesting program; otherwise the channel interprets the signal to continue the channel program with the next operation.)

As a separate operation asynchronous to the original write operation, a data mover 104 will read changed data from the DASD subsystem, using the DASD address information from the DASD-provided information packet described above (5). The data mover 104 in turn will add the data together with its sequence information packet to the next message to be sent to the secondary data mover 108 (6). (There may be multiple data mover 104 and 108 processes to accommodate the write traffic.)

A more robust design is also described as part of this disclosure, in which the data mover 104 returns the write information packet with its assigned global sequence number to the DASD subsystem. (This would add a step 2a in FIG. 2, from data mover 104 to DASD subsystem.) The DASD subsystem 14 subsequently appends the data mover 104-provided information packet to the changed data when it is sent to the data mover 108. This eliminates a potential uncertainty in the case of rapid multiple updates to the same record, a condition the base design described preceding must accommodate via programming. This positive return information packet method requires that the DASD subsystem 14 maintain a persistent cross-I/O operation work list of pending information packets and associated data.

Once duplexing sessions have been established, the secondary receives notification of pending writes and the updated write data for DASD it is maintaining in duplex copy. VTAM 106 receives the messages from the primary and passes them to the secondary data mover 108. Each of these messages contains three content segments, built by the primary data mover 106 and interpreted by the secondary data mover 108. The three segments of each message are referred to as M0, M1, and M2 (FIG. 3).

M0 is a data-mover-to-data-mover header that serves to maintain logical continuity of the message stream and identifies the message content. Message content may include information packet-data transmission (M1–M2), establish or terminate duplex session, initialize secondary copy, communicate logical acknowledge signals from secondary to primary, and for exception notification and recovery actions.

M1 contains the set of information packets assigned by the primary data mover 104 since the preceding message. These represent write operations in progress for which data is not at the secondary.

M2 contains a set of fields, with each field containing a information packet plus the write (update) data associated with that information packet.

The length of the message and the frequency of their transmission are design considerations that trade off intersystem transmission efficiency with the amount of time delay in notifying the secondary of write operations in progress. Efficiency is achieved by batching pending information packets and data into messages, amortizing transmission overhead over a larger number of M1 and M2 message elements. Shorter, more frequently sent message incur a greater total transmission overhead but act to keep the secondary closer in sync with (less behind) the primary. The concept is that the primary data mover 108 will pass a message to VTAM 106 when the message buffer has filled or at the expiration of a time interval since the preceding message was sent, whichever is shorter. Both message buffer size and the time interval are assumed to be selectable.

Each information packet contains sufficient information for the secondary data mover 108 to be able to determine what physical DASD records are to be updated, and to order these writes in the same sequence that the sequence information packets were assigned (which is, within a small degree of uncertainty, the same sequence that they will have been written on the primary DASD). The secondary data mover 108 first sees each information packet as it is received in the M1 message segment. The data mover 108 uses these information packets to maintain a pending write queue. As data for each information packet is received in M2 segments, it is matched with its information packet in the pending write queue (FIG. 3).

The secondary data mover 108 schedules I/O writes to the secondary DASD in the sequence of its pending write queue entries. Data for a given queue entry is not scheduled for write (7 in FIG. 2) until queue elements ahead of it have been scheduled for writing to DASD. Data arrives in M2 message segments as a function of when it was provided by the primary data mover 108. These updates are likely not to be in strict update sequence. Thus at any given time of activity, the pending write queue may have a sequence of complete entries—information packets plus associated write data, 'incomplete' information packets—without write data, followed by more complete information packets and incomplete information packets.

In one embodiment of this information packet synchronous with host write operation model, the sending of the information packet by the control unit must be performed by different internal storage path (SP), not the SP that is processing the write operation that the information packet is registering. In an ideal situation, the time to acquire a storage path, connect (or reconnect) to a channel to the global sequencer (hereinafter referred to as sequencer), and send the information packet would be completely overlapped by the data transfer of the write data. Any delay in getting a storage path or in connecting to the channel may cause the information packet send time to be greater than the write data transfer time, thus delaying the completion of the primary writer operation (adding to write response time).

The present invention provides a method that will allow DASD subsystem 14 to queue the information packet as a message to a sequencer without delaying the device end for the primary write operation and without compromising system-wide write operation sequence integrity that is essential for the secondary data to be usable in recovery.

Hence, what is required to maintain sequence integrity with asynchronous information packet presentation is that the sequencer periodically provide a sequence checkpoint. At this time, a set of information packets are grouped together and processed as a single sequence unit.

This sequence unit will be interpreted and processed as though all or none of the writes in the group had occurred. Also required are that DASD subsystems generate and maintain information packet sequence numbers and that they maintain a clock that can be precisely and accurately correlated in the sequencer systems's time of day clock.

The sequence number is required in addition to the time stamp to ensure that no information packets from a subsystem 14 are lost in transit. The sequencer, on receiving information packets, will ensure that the sequence numbers from each subsystem 14 form an unbroken sequence. Subsystem 14 numbers are values such that the sequencer program can detect missing information packets. The sequence number field size must be of sufficient size that rollover to zero does not introduce ambiguities in sequence number interpretation.

The clock must be of sufficient resolution and be able to be correlated with clock values in all other subsystems that comprise a session such that a write operation in one subsystem 14(1) that was initiated by an application as a result of a successful write to another subsystem 14 (2) will always be seen by its time stamp to have been written in the proper sequence (1 later than 2).

Figure 4:
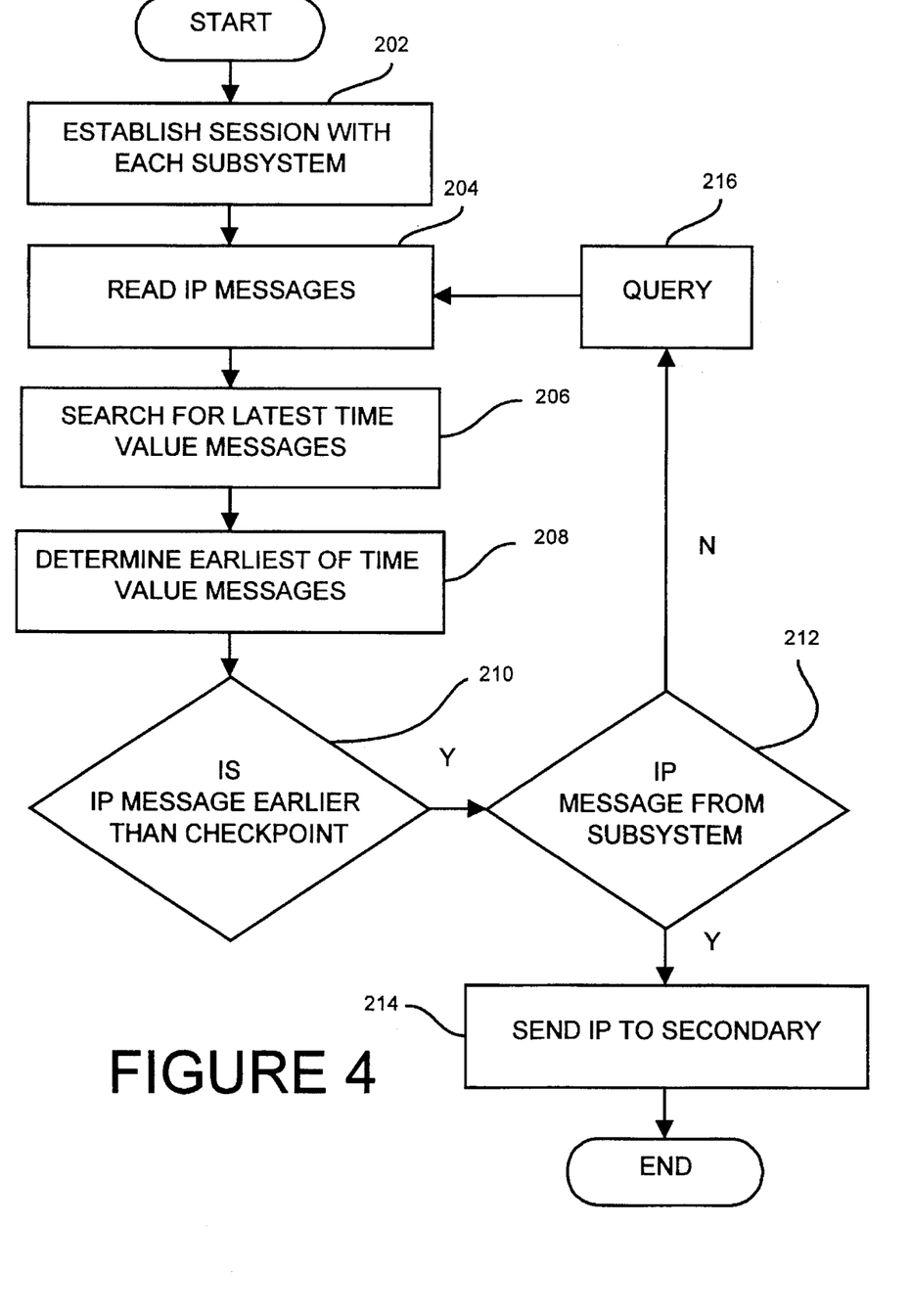
FIG. 4 is a flow chart of a method for duplexing DASD data in accordance with the present invention.
Figure 5:
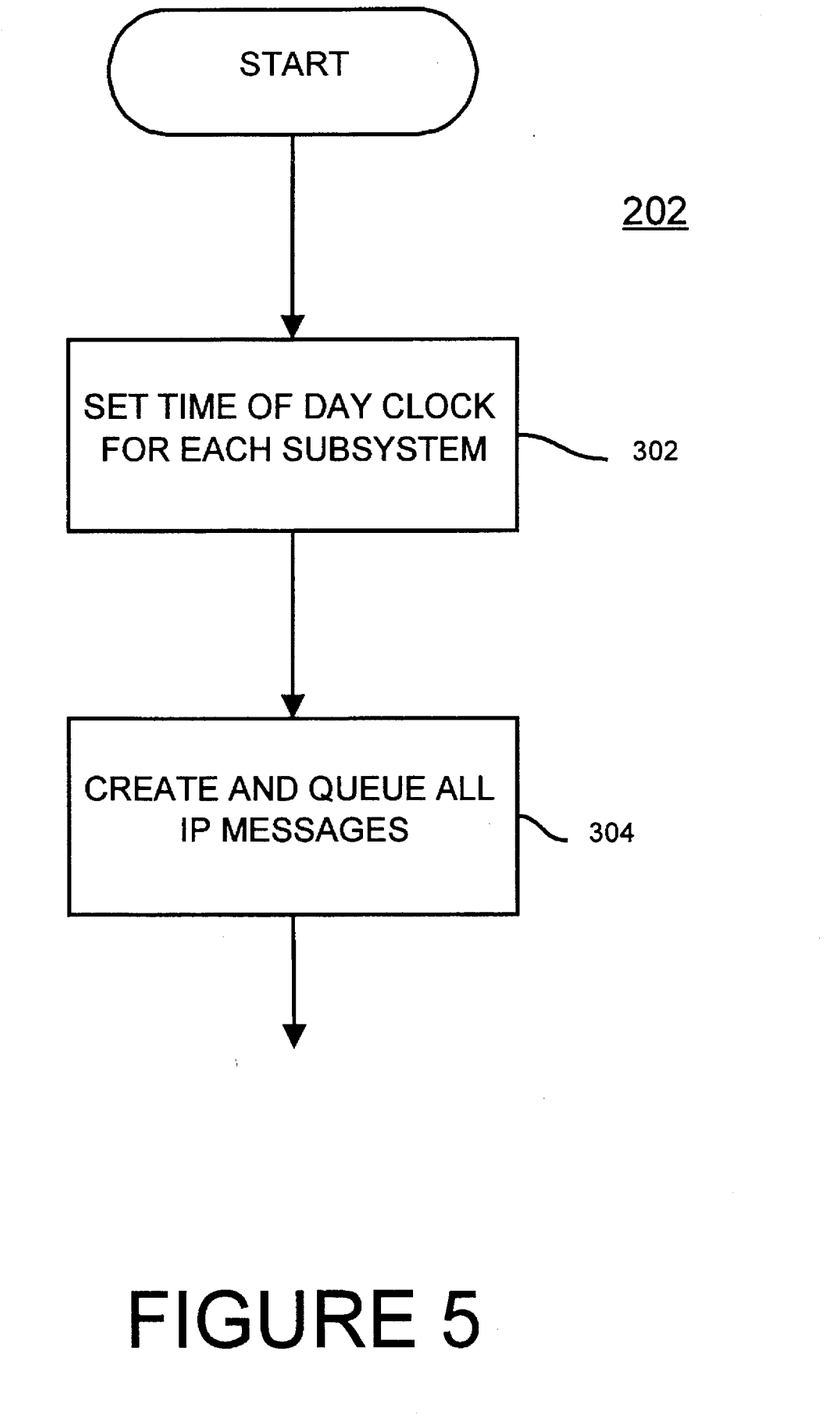
FIG. 5 is flow chart of a system for creating information packet messages in a system of the present invention.

To more specifically describe the operation of this method, refer now to flow charts in FIGS. 4 and 5.

The sequencer establishes a session with each DASD subsystem 14 (box 202), identifying extents to be duplexed. Referring now to FIG. 5, as part of establishing the session, the sequencer sets a time of day clock value for each subsystem 14 that can be correlated with the clock time for all other DASD subsystems participating in that session (box 302). Once a session has been established the subsystem 14 will create and queue an information packet message each time a write is processed to a track being duplexed (box 304). The information packet identifies the DASD records written, the subsystem's clock value, and subsystem 14 session sequence number. Referring back to FIG. 4, the sequencer reads these information packet messages (box 204), either in response to an attention signal from the subsystem 14 or as the final operation in a channel program that reads changed DASD data (to be written to the secondary DASD).

At any given instant, the sequencer will have a set of information packets from each subsystem, and there may be other information packets in each subsystem 14 that have not yet been transmitted to the sequencer. To establish the checkpoint group of data updates the sequencer searches for the latest highest time value time stamp from each subsystem 14 (box 206). The EARLIEST time value of these latest-time-per-subsystem time values becomes the time stamp value for the checkpoint (box 208).

All information packets with a time stamp equal to or less than (earlier than) the checkpoint time stamp form the checkpoint group. (For the first checkpoint of a session, these will be all information packets from the beginning of the session up to the checkpoint time. For subsequent checkpoints, it will be all information packets from the previous checkpoint time to the present checkpoint time.) The checkpoint group of information packets is then assigned a checkpoint sequence number and sent to the secondary process location, (box 214), where all the data updates represented in the checkpoint group are treated as a single unit for sequence integrity (changed data for all the information packets must be received before any data for a information packet in the group is written to the secondary DASD copy).

All the time the sequencer is establishing a checkpoint, it is possible that one or more subsystems may not have received any data write operations since the preceding checkpoint interval, or may not have been able to send its information packet messages to the sequencer during that time (box 212). If the sequencer has received no information packets from a subsystem 14 during a checkpoint interval, the sequencer will query the subsystem 14 for its last-sent information packet time and sequence value (box 216). This may either cause the subsystem 14 to send one or more queued information packets or send a value that can be verified as the same time and sequence value as the most recently received information packet received for a previous checkpoint interval, and part of an earlier sequence group).

The primary system may include DASD subsystems with the time of day clock capability and older subsystems that do not have this clock. These older subsystems can be intermixed with newer ones that implement this asynchronous information packet method; the older units' information packet presentation will be performed synchronous with the write, with the I/O write potential for performance delay described earlier. An older control unit, lacking a time clock, must present each information packet as it is generated, synchronously, with it write operation (as described preceding). The sequencer, on receiving information packets without time stamps, will assign a subsystem-local sequence number and the place the current system clock value in the information packet. From this point, that information packet is processed the same as other information packets.

Figure 6:
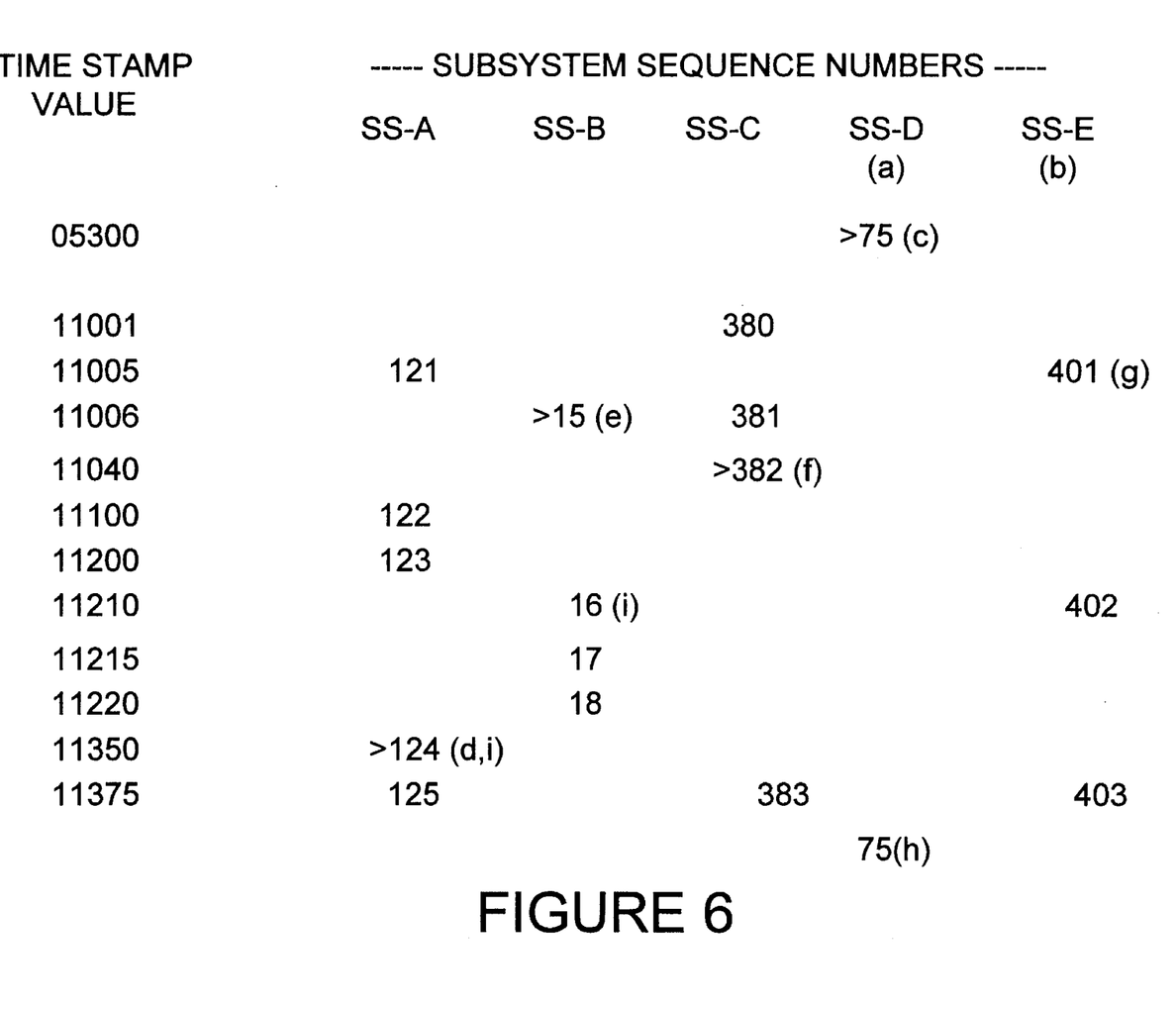
FIG. 6 is a chart showing a plurality of control units in a session in accordance with the present invention.

The method may be illustrated by FIG. 6 which is an example of a session spanning five subsystems (SS-A through SS-E). Notes indexed by the units in parentheses described critical aspects of the sequence checkpoint process. A '>' in front of a sequence number identifies the highest time value (most recent time stamp) information packet received from each of the Bodmer subsystems.

Subsystem A–D are control units with time clocks; subsystem E is a control unit without a time clock, with its sequence numbers and time value assigned by the sequencer.

Subsystem D is "inactive" for this checkpoint interval.

Sequence number 75 at time value 05300 was the last value received from subsystem D. That information packet was in an earlier sequence group.

Sequence 124 was the last information packet received from subsystem A and sequence 15 was the last information packet received from subsystem B. That subsystem has three more information packets queued (16–18) not yet received by the sequencer. (One may speculate that the peak business of that subsystem has delayed its information packet-send operation.)

Sequence 382 was the last information packet received from subsystem C. That subsystem has another information packet queued, (383) not yet received by the sequencer.

At this point the sequencer determines that the lowest time stamp value it has received from any one subsystem in the current sequence group interval is 11006 with sequence 15 from subsystem B. It recognizes that sequence 401 from subsystem E has a lower time stamp value than 11006, so 401 will be included in the sequence group. 402 is later, thus will not be included.

Likewise, A-121 and C-380 and 381 will be included in the sequence group, while A-122 through 124 and C-382 have later time stamp values so will not be included.

The sequencer has no values for subsystem D; so it queries the subsystem and receives 'last information packet sequence 15, time stamp 05300.' This corresponds to a information packet that is in a previous group (c), so the sequencer confirms that no information packets from subsystem D will be included in the current sequence group.

At this point, the sequence is complete and may be sent to the secondary. Let's now examine the relationship among some of the write operations with information packet time stamps greater than 11006, the current checkpoint time stamp. This will illustrate why the sequencer cannot include later time-stamped information packets in the current sequence group it has built.

Sequence 124 from subsystem A represents a sequence-dependent write, a write than an application initiated as a result of its seeing the completion of an earlier write that it initiated (sequence 16 from subsystem B). The sequencer knows about A-124—it has that information packet; it does not know about the preceding dependent write, B-16, since it has not yet received that information packet. It must not allow A-124 to be written to the secondary copy before B-16 is written.

In the general case, the sequencer has no way of knowing that A-124 was dependent on another write, much less than it was dependent on a write for which it has not yet received a information packet; thus it must not include information packets that it has received with time stamps later than its checkpoint value. It can ensure that is has all the information packets up to its checkpoint value, which was selected for this purpose, so they can be included in the current sequence group.

Through the use of the system, the write operation does not incur an unnecessary wait while the subsystem is sending the information packet to the sequencer. The present invention also decouples the write operation and sending information packets to the sequencer can be buffered in the subsystem without losing integrity. This is accomplished because each information packet is self-describing relative to other information packets in the same or different subsystems.

In addition, sending information packets as a group can significantly reduce the number of I/O operations required to retrieve the information packets. This system also used to advantage buffering multiple information packets to efficiently process rapid writer operations. Hence, if the write operations arrive in rapid succession, that is faster than the subsystem and sequencers ability to retain the update data, only the data for the latest of the information packets need to be applied to the secondary subsystem.

Since subsystem clocks are correlated with the host clock, writes can be associated with other system (host) activity. For example, the initiation or termination of a job on the host can be correlated with specific write events. This can be useful in recovering data and environment on the secondary site. That is, in addition to sequencing write events, this approach also sequences them with other system events such as application log files or the starting of a specific job.

Although the present invention has been described in accordance with the embodiments shown in the figures, one of ordinary skill in the art recognizes that there could be variations to the embodiments and those variations would be within the sphere and scope of the present invention. Accordingly, many modifications may be made by one of ordinary skill in the art without departing from the spirit and scope of the invention, the scope of which is defined solely by the appended claims.

We claim:

1. In a system for duplexing remote data, the system including a plurality of direct access storage device (DASD) subsystems, each subsystem including a plurality of information packet messages associated with DASD data write operation, each of the information packet messages having a time value associated therewith, each of the information packet messages having a sequence number, a method for asynchronously duplexing DASD data content from the DASD subsystems comprising the steps of:

(a) establishing a session with each of the plurality of subsystems;

(b) reading the information packet messages from each of the DASD subsystems after a write operation to the subsystem;

(c) establishing a periodic sequence checkpoint based on a latest time value associated with one of the plurality of information packet messages to group a plurality of information packet messages together as a single sequence unit;

(d) sending the sequence unit to a secondary location for processing;

(e) obtaining DASD data associated with the information packet messages from each of the subsystems; and (f) sending the DASD data to a secondary location.

2. The method of claim 1 in which step (b) further comprises the steps of:

(a) setting a time of day clock value for each subsystem that can be correlated with a clock time for the other of the plurality of subsystems.

3. The method of claim 2 in which:

each of the subsystems create and queue an information packet message each time a write operation is processed.

4. The method of claim 1 in which step (c) further comprises the steps of:

(a) searching for a latest time value of the information packet messages from each of the plurality of subsystems;

(b) establishing the earliest of the latest time value for the information packet messages as a checkpoint; and (c) grouping all information packet messages from the plurality of subsystems which have a time value that is earlier than the time value of the checkpoint into a sequence unit.

5. The method of claim 4 which further comprises the steps of:

(a) querying a subsystem if there is no write operation received from the subsystem; and (b) causing the subsystem to send the last sent information packet time value.

6. The method of claim 4 which further comprises the steps of:

(a) querying a subsystem if there is no write operation received from the subsystem; and (b) causing the subsystem to send at least one information packet message.

7. In a system for duplexing remote data, the system including a plurality of direct access storage device (DASD) subsystems, each subsystem including a plurality of information packets associated with a DASD data write operation, each of the information packets having a time value associated therewith, each of the information packets having a sequence number, a global sequencer for asynchronously duplexing information packet messages from the DASD subsystems comprising;

means for establishing a session with each of the plurality of subsystems;

means responsive to the session establishing means for reading the information packets from each of the DASD subsystems after a write operation to the subsystems;

means responsive to the reading means for establishing a periodic sequence checkpoint based on a latest time value associated with one of the plurality of information packets to group a plurality of information packets together as a single sequence unit; and means responsive to sequence checkpoint establishing means for sending the single sequence unit to a secondary location for processing.

8. The sequencer of claim 7 in which the session establishing means comprises:

means for setting a time of day clock value for each subsystem that can be correlated with a clock time for the others of the plurality of the subsystems.

9. The sequencer of claim 8 in which each of the subsystems create and queue an information packet message each time a write operation is processed.

10. The sequencer of claim 7 in which the sequence checkpoint establishing means comprises:

means for searching for a latest time value of the information packet messages from each of the plurality of subsystems;

means responsive to the searching means for establishing the earliest of the latest time value information packets as a checkpoint; and means responsive to the time value establishing means for grouping all information packets from the plurality of subsystems which have a time value that is earlier than the time value of the checkpoint into a sequence unit.

11. The sequencer of claim 10 which further comprises:
means for querying a subsystem if there is no write operation received from the subsystem; and means responsive to the querying means for causing the subsystem to send the last sent information packet time value.

12. The sequencer of claim 9 which further comprises:

means for querying a subsystem if there is no write operation received from the subsystem; and means responsive to the querying means for causing the subsystem to send at least one information packet message.

13. A computer readable medium containing program instructions for asynchronously duplexing direct access storage device (DASD) data content from DASD subsystems in a system including a plurality of subsystems, each subsystem including a plurality of information packet messages associated with DASD data write operations, each of the information packet messages having a time value associated therewith, each of the information packet messages having a sequence number, the program instructions comprising:

establishing a session with each of the plurality of subsystems;

reading the information packet messages from each of the DASD subsystems after a write operation to the subsystem;

establishing a sequence checkpoint based on a latest time value associated with one of the plurality of information packet messages to group a plurality of information packet messages together as a single sequence unit;

sending the sequence unit to a secondary location for processing;

obtaining DASD data associated with the information packet messages from each of the subsystems; and sending the DASD data to a secondary location.

\* \* \* \* \*